United States Patent [19]

Brennan

[11] Patent Number: 5,425,395
[45] Date of Patent: Jun. 20, 1995

[54] TAPPING TEE ASSEMBLY
[75] Inventor: Michael Brennan, Perry, Ohio
[73] Assignee: Perfection Corporation, Madison, Ohio
[21] Appl. No.: 305,013
[22] Filed: Sep. 13, 1994
[51] Int. Cl.⁶ .................. B23B 41/08; F16L 41/06; F16K 43/00
[52] U.S. Cl. ........................ 137/318; 30/95; 30/98; 30/99; 83/745; 408/102; 408/137; 408/207
[58] Field of Search .................. 137/15, 315, 318; 30/94, 95, 98, 99; 83/54, 745; 408/67, 87, 99, 102, 110, 111, 129, 137, 204, 207

[56] References Cited

U.S. PATENT DOCUMENTS

| Re. 26,447 | 8/1968 | McMurray et al. | 137/318 |
|---|---|---|---|
| Re. 27,431 | 7/1972 | Nielsen, Jr. | 137/318 |
| 2,794,352 | 6/1957 | Mueller | 137/318 |
| 2,839,075 | 6/1958 | Mueller | 137/318 |
| 3,176,708 | 4/1965 | Shields | 137/318 |
| 3,349,792 | 10/1967 | Larkin | 137/318 |
| 3,756,261 | 9/1973 | Minchoff | 137/318 |
| 3,995,655 | 12/1976 | Sands | 137/318 |
| 4,029,118 | 6/1977 | Merideth | 137/318 |
| 4,063,844 | 12/1977 | Pessia | 137/318 |
| 4,076,038 | 2/1978 | Wynne | 137/318 |
| 4,258,742 | 3/1981 | Louthan et al. | 137/318 |
| 4,680,848 | 7/1987 | Goldner | 137/318 |
| 4,682,624 | 7/1987 | Turner | 137/318 |
| 4,730,636 | 3/1988 | Volgstadt et al. | 137/318 |
| 4,809,735 | 3/1989 | Volgstadt et al. | 137/318 |
| 5,076,318 | 12/1991 | Fedora | 137/318 |
| 5,105,844 | 4/1992 | King, Sr. | 137/318 |

Primary Examiner—George L. Walton
Attorney, Agent, or Firm—Fay, Sharpe, Beall, Fagan, Minnich & McKee

[57] ABSTRACT

The tapping apparatus includes a body that receives a cutter and sleeve. The cutter and sleeve advance together to form an opening in the sidewall of a main conduit about which the body is secured. The sleeve includes external threads that grip into the conduit sidewall. Thereafter, retraction of the cutter leaves the sleeve in place to secure the tapping apparatus to the conduit and establish fluid communication therethrough. The cutter and sleeve preferably have different thread pitches so that the sleeve advances at a slightly faster rate than the cutter. This facilitates sealing engagement between the external surface of the main conduit and the body. Additionally, a one-way drive arrangement is provided between the sleeve and cutter so that once the sleeve is positioned in place, the cutter can be removed without altering the location of the sleeve.

18 Claims, 2 Drawing Sheets

TAPPING TEE ASSEMBLY

BACKGROUND OF THE INVENTION

This invention pertains to the art of tapping conduits and more particularly to tapping a conduit such as a plastic gas line in order to establish communication with a service line. The invention is particularly applicable to tapping a main fluid line and will be described with particular reference thereto. However, it will be appreciated that the application has broader applications and may be advantageously employed in related environments and applications.

U.S. Pat. No. 4,809,735 to Volgstadt, et al. is commonly assigned to the same assignee as the present invention. It describes in detail a commercially successful tapping tee apparatus comprised of multiple parts. Particularly, a surrounding saddle or support assembly is received around the main conduit. A generally cylindrical body is integrally formed with the support assembly and receives a tapping assembly therein. An internally threaded passage extends through the body and is generally perpendicular to the longitudinal axis of the main line. The tapping assembly includes a cutter member that is selectively threadedly advanced through a sidewall of the main conduit, forming an opening as it is rotated through the sidewall. A spreading or tapered portion of the cutter member advances through the opening to firmly grip the inner wall of the main conduit when properly positioned in place. An elongated portion of the cutter member remains within the main conduit, generally radially inward of the tapered portion. An upper portion of the tapping assembly is subsequently threadedly retracted from the cutter member to establish fluid communication from the main line, through apertures provided in the cutter member, and to a branch or service line connected to the body.

A second embodiment also uses a two-part cutter but is modified so that material cut from the sidewall of the main conduit, or coupon as it is generally referred to, is removed from the interior of the main conduit. In most other respects, this modified embodiment works in much the same way to establish a fluid passage from the main conduit to a branch passage or service line.

Although commercially successful, there are areas where improvement is desired in the above described tapping assemblies. For example, the internally threaded passageway received in a tower portion of the body is relatively long to accommodate the above-described tapping assembly. Moreover, this arrangement still results in a relatively small bore that limits the amount of flow between the main conduit and the branch passage. Due to its complexity, the tapping assembly is rather expensive to manufacture. It also results in a relatively large profile or extended portion of the cutter member remaining in the main conduit. This is not particularly desired since it could potentially interfere with the passage of objects through the main conduit.

On the other hand, it is desirable to maintain a secure, easy to use arrangement that provides positive feedback to the installer or user of its proper installation. Likewise, it is desired to universalize the tools necessary to secure the assembly to the main.

SUMMARY

The present invention contemplates a new and improved tapping apparatus that overcomes all of the above-referenced problems and others while retaining many of the advantageous features of predecessor tapping assemblies and is economical to manufacture and simple to use.

According to the present invention, there is provided a body member having an internal passage that receives a tapping apparatus comprised of a cutter and sleeve. The cutter has a cutting edge at one end that is selectively advanced and retracted toward and away from a main conduit. The sleeve is received over a portion of the cutter and is externally threaded for securing the tapping apparatus to a conduit.

According to a more limited aspect of the invention, the cutter and sleeve are both externally threaded and have different threaded pitches for advancing these elements at different rates.

According to a still more limited aspect of the invention, the cutter and sleeve include drive elements that selectively engage and disengage to accommodate the differential advancement of these components.

According to yet another aspect of the invention, a retainer member temporarily holds the sleeve and cutter together.

A principal advantage of the invention is the reduced complexity and decreased cost to manufacture the tapping apparatus.

Yet another advantage of the invention resides in the low profile of the tapping apparatus that remains in the tapped conduit.

Still another advantage of the subject invention is realized by the increased flow between the main conduit and the branch passage.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
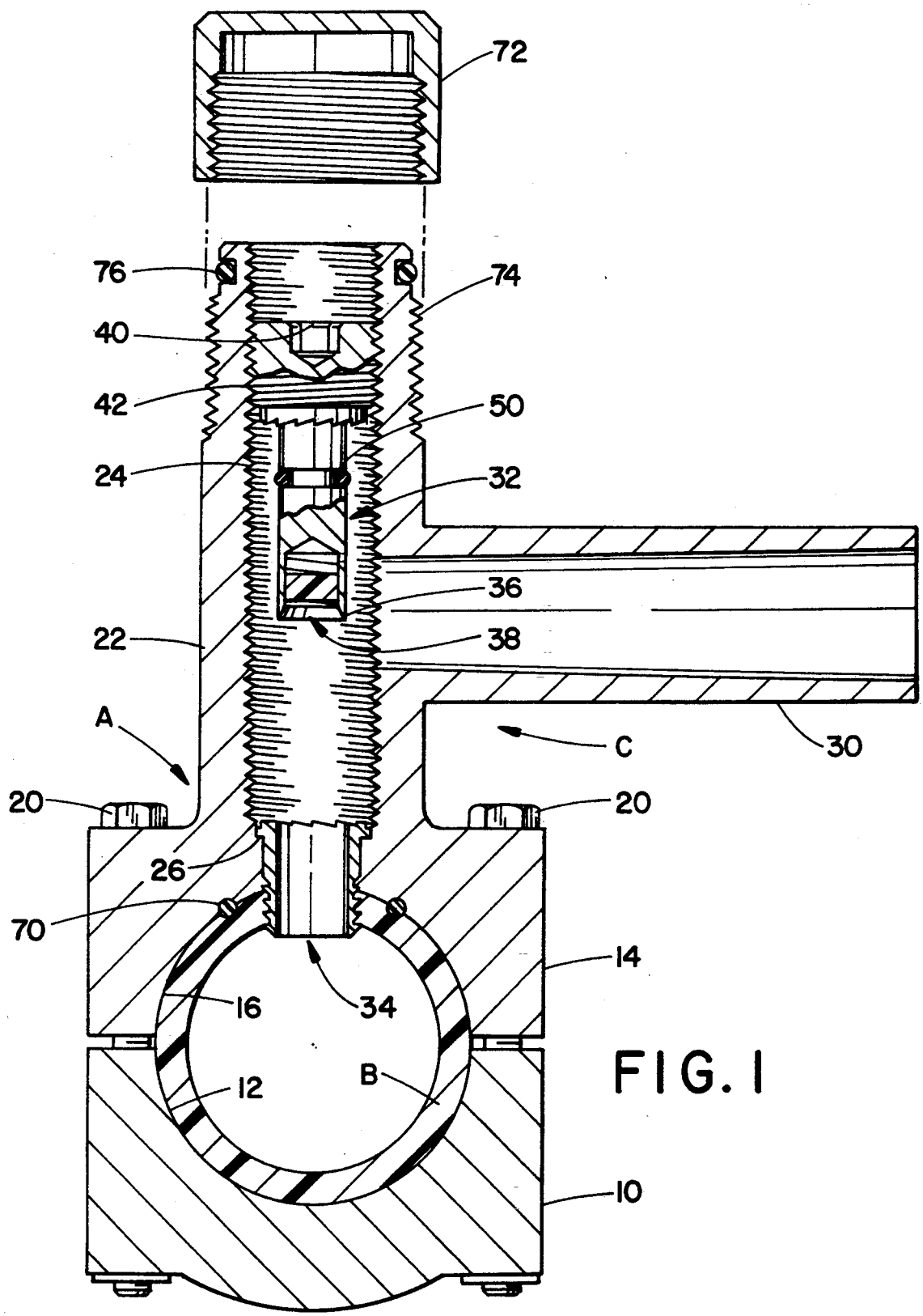
FIG. 1 is a cross-sectional view of the subject new tapping assembly associated with a main conduit.

Referring now to the drawings wherein the showings are for the purposes of illustrating the preferred embodiments of the invention only and not for purposes of limiting same, the FIGURES show a tapping assembly that includes a body assembly A received around a main conduit B that is selectively tapped by tapping apparatus C. More particularly, and with reference to FIGS. 1 and 2, the body assembly is shown as a two-part saddle having a lower or first body portion 10. The lower body portion has a curvilinear recess 12 that conforms to the outer surface of main conduit B. In the preferred arrangement, the recess is configured to cover approximately one-half the circumference of the main conduit along a limited axial extent of the main conduit. Likewise, an upper or second body portion 14 has a curvilinear recess 16 that conforms to the outer surface of the main conduit. It, too, is adapted to extend over approximately one-half the total circumference of the main conduit. A fastening arrangement such as individual fasteners 20 are used to secure the first and second body portions together and provide clamping engagement about the outer surface of the conduit, i.e. about the entire circumference of the main conduit at a desired axial location.

Extending generally perpendicularly outward to the longitudinal axis of the main conduit is a tower 22 integrally formed as part of the second body portion. The tower has a generally cylindrical configuration although other configurations could be used with equal success. A first or main passage 24 extends through the tower and is preferably internally threaded over at least a portion thereof. An internal shoulder 26 is also provided in the main passage for reasons which will become more apparent below. Communicating with the main passage is a second or branch passage 30. The branch passage is adapted for communication with a service line or other individual hookup (not shown), details of which are well known in the art and require no further description therein. Preferably, the branch passage is also integrally formed with the second body portion so that it can be installed with the tower in a single structure. Alternatively, separate components can be used although they are not as conducive to ease of assembly and installation.

Figure 2:
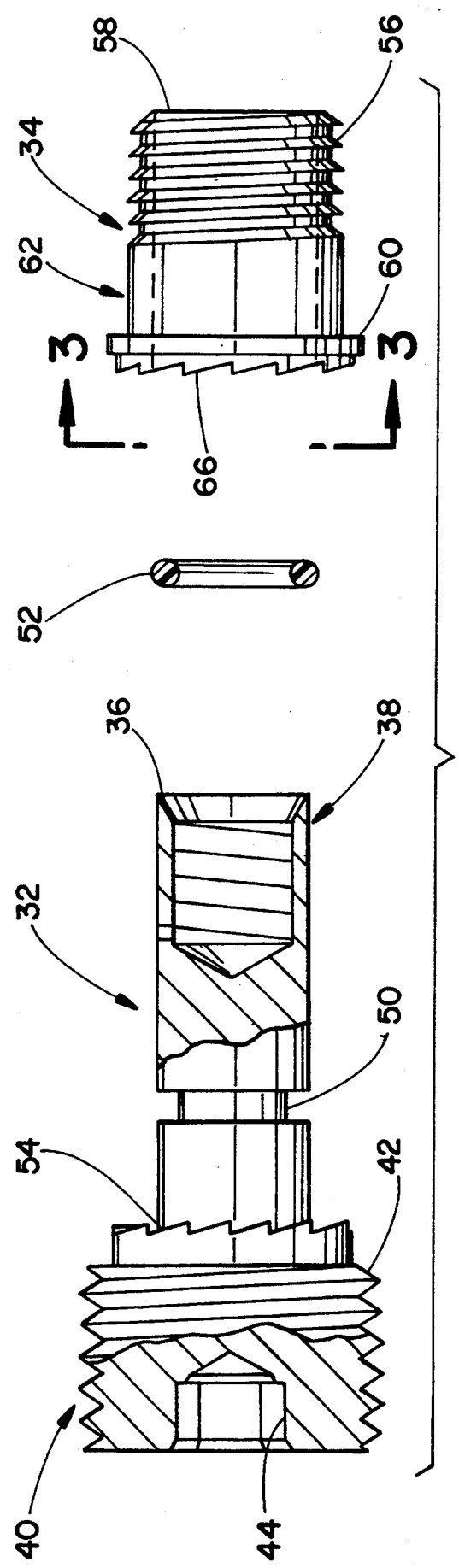
FIG. 2 is an enlarged view shown in partial cross section of the separate components that cooperate to define the subject new tapping assembly.

With more particular reference to FIG. 2, the tapping apparatus includes a first component that will be hereafter referred to as a cutter 32 and a second component that will be hereafter referred to as a sleeve 34. The cutter includes an annular cutting edge 36 at a first end 38. The cutting edge is dimensioned to cut through the sidewall of the conduit and subsequently remove the coupon cut from the sidewall. The opening formed by this cutting operation is used to establish fluid communication between the main conduit and branch passage so that gas or like fluid can be provided to the service line.

A second end 40 of the cutter includes an externally threaded region 42. The threaded region has a first preselected thread pitch that cooperates with the internally threaded main passage 24 of the tower. Upon rotation of the cutter relative to the body, the cutter is either axially advanced or retracted toward the main conduit. The second end of the cutter also includes a tool receiving recess such as a hex-shaped tool socket that receives an appropriate tool (not shown) to effect the rotation of the cutter. In the preferred arrangement, the tool has a surface that is sized to provide dual use in tightening the fasteners that secure the saddle about the main conduit and then to advance and retract the cutter relative to the tower. Of course other tool arrangements can be used without departing from the scope and intent of the subject invention.

Interposed between the first and second ends of the cutter is an external groove 50 that receives a resilient member such as an O-ring adopted for interference, sealing fit with the sleeve. Although the O-ring also provides for a sealing connection, its primary purpose is to temporarily retain the sleeve and cutter together when the sleeve and cutter are handled externally of the tower and yet permitting relative movement therebetween when the cutter is advanced and retracted within the tower.

The second end of the cutter also includes a rachet arrangement 54 that provides for selective driving between the cutter and sleeve. More particular details of the ratchet arrangement and the benefits offered thereby will be described below.

The sleeve 34 is a generally tubular or hollow cylindrical member having external threads 56 extending inwardly from a first end 58 and a radially extending shoulder 60 at a second end 62. The sleeve is dimensioned for close receipt around the cutter and forms an interference fit therewith via the O-ring 52. The threads 56 advance into and grip the sidewall of the main conduit after the cutting edge 36 of the cutter has removed the coupon from the sidewall. The threads extend along the sleeve a dimension sufficient to engage along the entire depth of the sidewall. Moreover, the shoulder 60 cooperates with the internal shoulder 26 in the tapping tower to limit further advancement of the sleeve into the main conduit sidewall. In this way, little, if any, of the sleeve first end extends into the main conduit. It does, however, provide substantial resistance against pull out forces, i.e., forces directed along the longitudinal axis of the tower. Moreover, the threaded sleeve stabilizes the tapping assembly against movement in a circumferential direction of the main conduit and also along the longitudinal axis of the main conduit. This in conjunction with the clamping arrangement provided by the body portions secures the tapping assembly along the main conduit.

A ratchet element 66 is provided at the second end of the sleeve. Specifically, the ratchet element 54 of the cutter and ratchet element 66 of the sleeve are defined by a series of sloped or ramped shoulders. The ramped shoulders are circumferentially spaced apart and provide for a one-way driving engagement between the cutter and sleeve. Thus, as the cutter is advanced by an associated tool, the ratchet elements cooperate (i.e., the shoulders engage) with one another to provide driving rotatable and axial movement to the sleeve. Rotation of the cutter in the opposite direction allows the tapered surfaces to slide one over the other as the cutter is retracted from the sleeve in a direction away from the main conduit.

In accordance with a preferred aspect of this invention, the external threads 56 on the sleeve have a second preselected thread pitch that is different from the thread pitch on the cutter. Specifically, a greater number of threads per inch is provided on the cutter than on the sleeve. By way of example only, the thread pitch on the cutter may be eight threads per inch while the thread pitch on the sleeve is approximately six threads per inch. This relationship requires a lesser number of turns to advance the sleeve through a predetermined distance than are required to axially advance the cutter the same dimension. Accordingly, the sleeve will advance at a slightly faster rate into the sidewall of the main conduit. As the cutter is advanced by the associated tool, the sleeve will begin its threaded engagement with the conduit sidewall. At selected stages of the axial advancement, the sleeve becomes axially separated from the cutter, i.e., the ratchet elements 54, 66 will become separated. This differential threaded relationship between the cutter and sleeve assures that the external surface of the conduit is held in sealing engagement with the upper body portion 14 of the body member A. An O-ring 70 provided in the second body portion 14 sealingly engages around the opening formed by the cutter through the sidewall of the main conduit. Thus, the different thread pitches of the tapping assembly are intended to urge/pull the main conduit into tight sealing engagement with the upper body portion during the tapping operation.

Even though the cutter and sleeve may become temporarily separated, continued rotation and axial advancement of the cutter toward the main conduit eventually results in cooperative engagement between the ratchet elements 54, 66 for continued rotation and axial movement of the sleeve into the sidewall of the main conduit. Once the shoulder 60 of the sleeve engages the internal shoulder 26 of the tapping tower, however, continued axial advancement of the sleeve is not possible. This provides a positive feedback to the user or installer that the sleeve is in place and that the coupon has been cut from the sidewall.

Thereafter, the cutter is rotated in the opposite direction and axially retracted from the main conduit. Preferably, this threaded retraction is continued until the terminal edge of the second end 40 of the cutter is flush with the top of the tapping tower. By predetermined dimensioning, the installer is assured that fluid communication is now established between the main conduit, through the sleeve, through the tapping tower, and to the branch passage 30. A cap 72 is received over external threads 74 in the tower and seal ring 76 prevents leakage of gas between the tower and associated cap.

Figure 4:
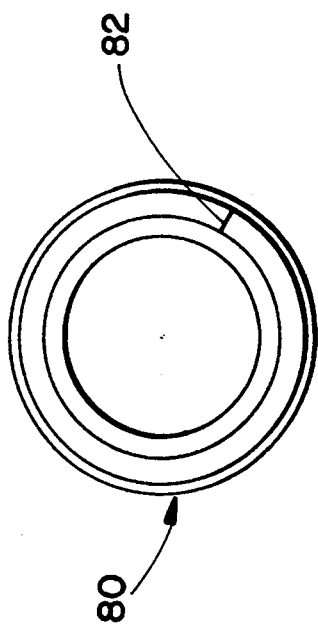
FIG. 4 shows another preferred embodiment providing selective driving action between the components of the tapping assembly.
Figure 3:
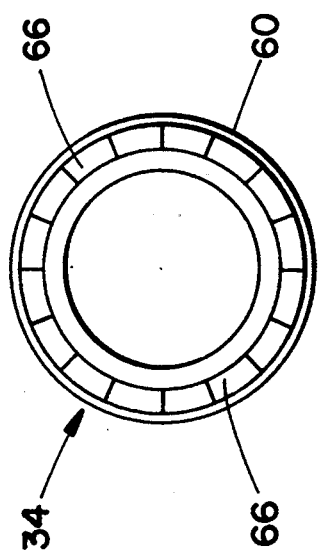
FIG. 3 is an end view taken generally along the lines 3—3 of FIG. 2.

As shown in FIG. 4, a modified arrangement of the subject invention also provides for one-way driving engagement between the cutter and sleeve. Rather than a series of tapered shoulders, a continuous helical edge defines a single shoulder 80 that cooperates with a like shoulder 82 on the sleeve. In this manner, the shoulders 80, 82 are brought into abutting engagement and selectively advance the cutter and sleeve together toward the main conduit. Rotation in the opposite direction allows the shoulders to slide one over the other so that the cutter may be retracted via its external threaded arrangement with the tapping tower. The sleeve, though, will remain in place in the sidewall of the main conduit.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. An apparatus adapted for tapping an associated conduit, the tapping apparatus comprising:
   a body member having an internal threaded passage;
   a cutter having an externally threaded region that cooperates with the threaded passage of the body member for advancing and retracting the cutter in response to rotation and a cutting edge at one end adapted to cut an opening through the conduit;
   a sleeve received over at least a portion of the cutter and located adjacent the cutting edge, the sleeve including an externally threaded region adapted for threadedly advancing the sleeve into the cut opening and securing the tapping apparatus to the conduit; and
   cooperating drive element disposed on both of the cutter and the sleeve and being positioned therebetween for selectively engaging one another to rotate the sleeve in response to rotation of the cutter in a direction that advances the cutter toward the conduit.

2. The apparatus as defined in claim 1 wherein the drive elements on the cutter and sleeve selectively disengage when the cutter is rotated in a direction that retracts the cutter away from the conduit.

3. The apparatus as defined in claim 1 further comprising a retainer member interposed between the sleeve and cutter to temporarily hold the sleeve on the cutter.

4. The apparatus as defined in claim 3 wherein the retainer member includes a resilient member that holds the sleeve on the cutter until a predetermined axial removing force is applied.

5. The apparatus as defined in claim 1 wherein the cutter threaded region has a preselected first thread pitch and the sleeve threaded region has a preselected second thread pitch different from the first thread pitch.

6. The apparatus as defined in claim 5 wherein the first thread pitch has a greater number of threads per inch than the second thread pitch.

7. The apparatus as defined in claim 6 wherein the first thread pitch is approximately eight threads per inch.

8. The apparatus as defined in claim 7 wherein the second thread pitch is approximately six threads per inch.

9. The apparatus as defined in claim 1 wherein the cutter has a radial shoulder disposed thereon adapted to engage a raised surface of the sleeve.

10. A tapping tee apparatus for forming an opening in a sidewall of a conduit, the apparatus comprising:
    a body member including a saddle that is adapted for circumferential receipt around the conduit, and an internally threaded passage adapted to extend outwardly from the conduit in a generally perpendicular direction;
    an externally threaded cutter received in the body member passage for selective advancement and retraction therein upon rotation relative to the body member, the cutter including a cutting edge at one end adapted to cut a coupon from and pass through the sidewall upon advancement toward the conduit and retain the coupon upon retraction from the conduit;
    a sleeve received around the cutter and including an external threaded region adapted to thread into the conduit sidewall where the coupon was removed; and
    a one-way drive connection having engaging surface between the sleeve and cutter to selectively engage one another so that the sleeve is threaded into engagement with the sidewall and retained in place when the cutter is retracted in the body member with the retained coupon.

11. The tapping tee apparatus as defined in claim 10 wherein the sleeve includes a radial shoulder that engages a shoulder in the body member adapted to limit further advancement of the sleeve into the sidewall of the conduit.

12. The tapping tee apparatus as defined in claim 11 wherein the external threads on the cutter and the sleeve have a different pitch.

13. The tapping tee apparatus as defined in claim 12 wherein the cutter has a greater number of threads per inch than the number threads per inch on the sleeve.

14. The tapping tee as defined in claim 10 wherein the cutter includes a tool receiving surface that is compatible with tool receiving surfaces associated with the body member saddle.

15. The tapping tee as defined in claim 10 further comprising a securing member that temporarily secures the sleeve and cutter together.

16. The tapping tee as defined in claim 15 wherein the securing member includes an elastomeric ring interposed between the cutter and sleeve.

17. The tapping tee as defined in claim 10 wherein the body member includes a branch passage communicating with the threaded passage to define a flow path to a downstream use once the sleeve is in threaded engagement with the sidewall of the conduit and the cutter carrying the coupon has been sufficiently retracted from the conduit sidewall.

18. The tapping tee as defined in claim 17 wherein the threaded passage and cutter are suitably dimensioned so that retraction of the cutter to a location flush with an end of the passage spaced from the conduit is sufficient to open fluid communication between the passage and the branch passage.

* * * * *